United States Patent

[11] 3,599,947

[72] Inventor William Lyon Sherwood
P.O. Box 2161, Vancouver 3, British Columbia, Canada
[21] Appl. No. 7,553
[23] Division of Ser. No. 398,625, Pat. No. 3,503,736.
[22] Filed Feb. 2, 1970
[45] Patented Aug. 17, 1971

[54] APPARATUS FOR DIRECT IRON AND STEEL MAKING
13 Claims, 11 Drawing Figs.
[52] U.S. Cl.................................................. 266/9, 266/36
[51] Int. Cl.................................................. C21b 11/06
[50] Field of Search........................................ 266/9, 11, 36 R

[56] References Cited
UNITED STATES PATENTS
3,180,725  4/1965  Meyer et al................... 75/36
3,113,859  12/1963  Moklebust..................... 75/36

Primary Examiner—Gerald A. Dost

ABSTRACT: The apparatus comprises a single, elongated rotary furnace reactor, including a gas-solid reaction zone, a gas-solid-liquid reaction zone and a gas-liquid reaction zone extending in this sequence from the charge end to the discharge end. A feeding device is provided at the charge end of the reactor for introducing a charge of iron ore pellets in admixture with solid reductant and sulphur-absorbent material into the gas-solid reaction zone. There are burners at intervals along the furnace for introducing oxygen-containing gas and fuel, as required, for reaction and heating of the charge. At the termination of the gas-solid reaction zone is a screening device forming a portion of the reactor wall for removing fine-sized materials including excess reductant, ash and sulphur-absorbent material just prior to passing the retained iron pellets into the gas-solid-liquid reaction zone. This zone is also provided with a burner for melting, and there is another burner at the reactor discharge end for heating and temperature control in the gas-liquid reaction zone prior to discharge of the liquid iron and steel in preparation for casting. The reactor is fired countercurrently to the general movement of charge, whereby waste heat from each reaction zone is utilized as supplementary heat for preceding zones.

The invention is a process and apparatus for the production of liquid iron and steel directly from iron ore or ore concentrates.

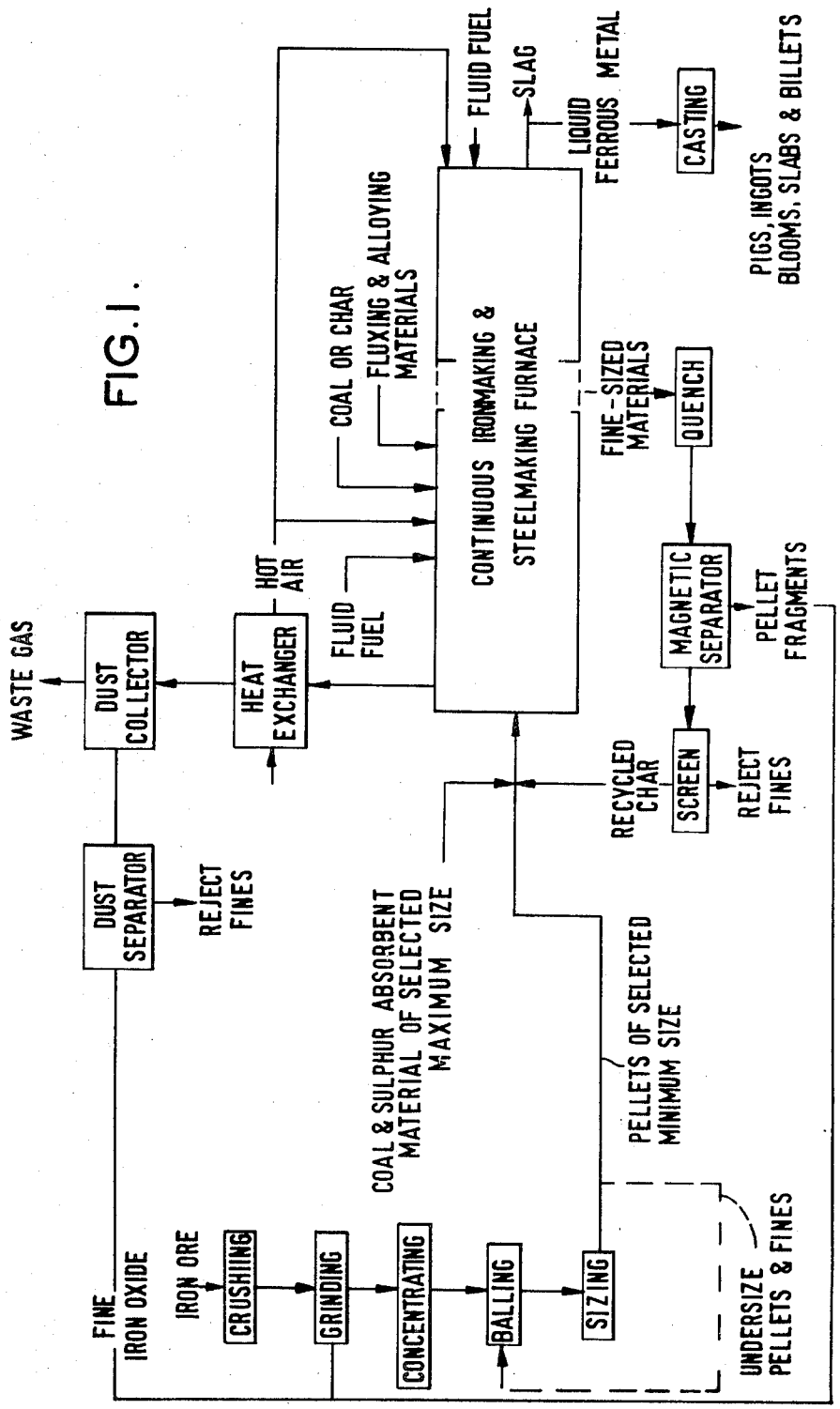

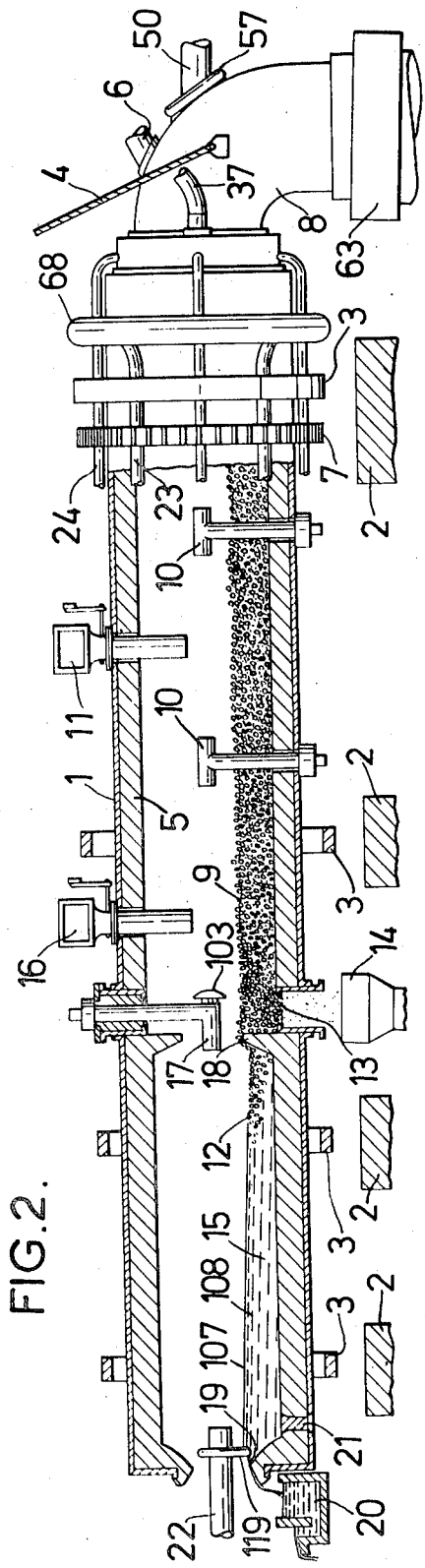
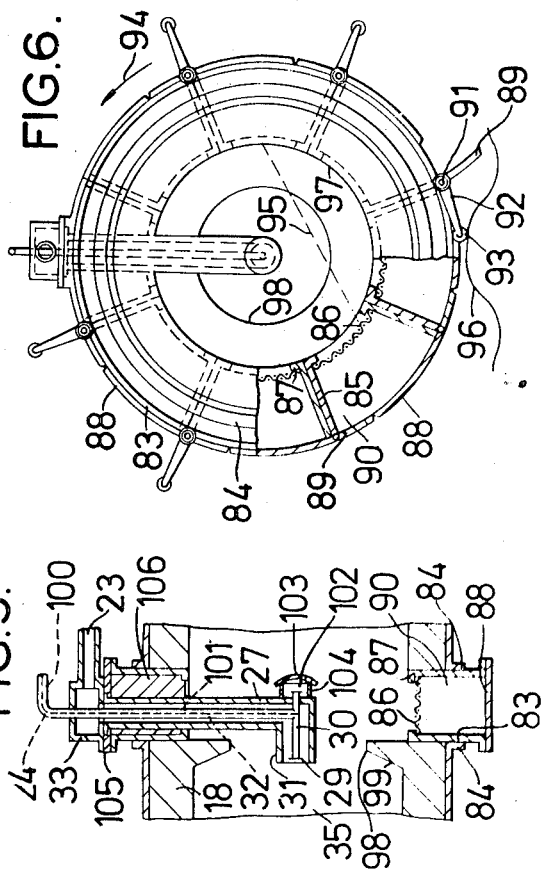
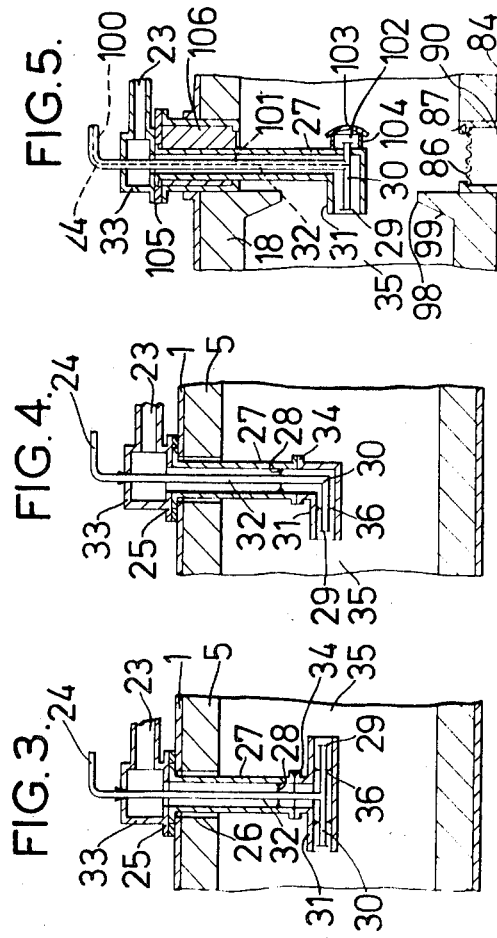

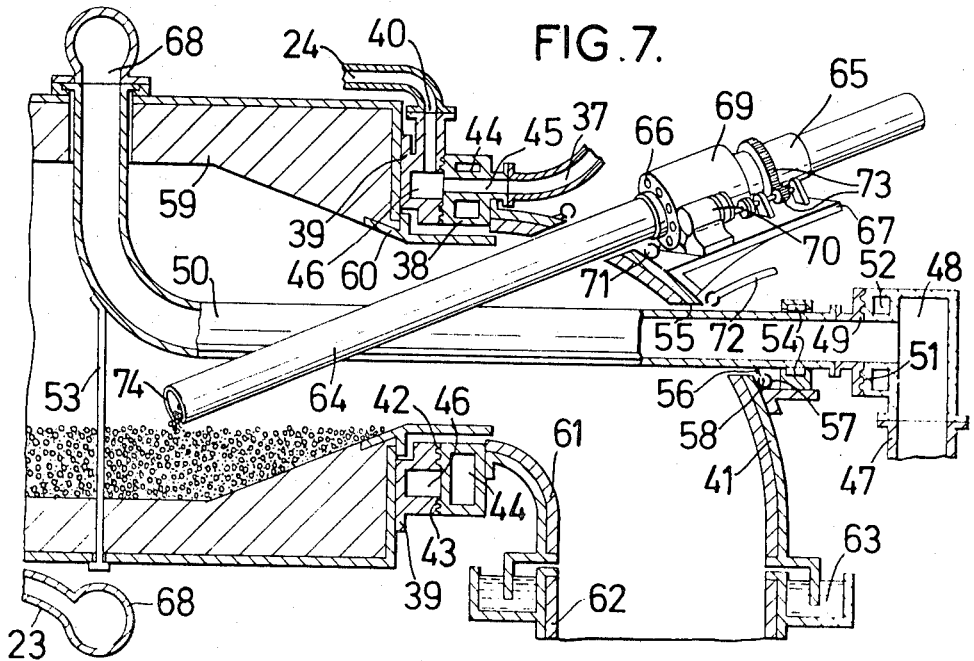

APPARATUS FOR DIRECT IRON AND STEEL MAKING

This application is a division of my copending applications Ser. No. 398,625 which has been issued as U.S. Pat No. 3,503,736, Mar. 31, 1970, which is also a continuation-in-part of applications Ser. Nos. 262,078 now abandoned, and 330,895, now abandoned.

Known processes for processing iron ore to obtain alloys of iron having a closely controlled composition generally involve two separate processing operations; firstly, a reduction process in which an iron containing undesirable impurities is obtained; and secondly, a refining process in which the undesired impurities are removed from the impure iron and alloying additions are made to obtain the desired product composition.

The product of the reduction operation is usually pig iron produced in liquid form by means of the blast furnace or an electric reduction furnace process, or sponge iron produced in solid form by means of a direct reduction process. Pig iron generally contains carbon, silicon, manganese, phosphorus and sulfur, and sponge iron generally contains residual iron oxide and gangue constituents, as impurities which require adjustment to the desired level in the subsequent refining process.

Known refining processes include the open-hearth process, various converter processes, rotary furnace processes, and the direct-arc electric furnace process for production of steel, the cupola for production of cast iron and the electric induction, direct-arc and indirect-arc furnace processes for production of various alloys of iron. These processes are generally conducted in batches and, in addition to pig iron and sponge iron, employ scrap iron, steel and other iron alloys in the charge mixture.

It is a principal object of this invention to provide a new process and apparatus for producing liquid ferrous metals directly from iron ore and ore concentrate, combining reduction, melting and refining stages into successive continuing operations.

It is another object of the process and apparatus of this invention to provide elongated, continuous reaction zones along which various processing stages may occur simultaneously, and which extend without interruption from charging of iron oxide with reductant to discharging of liquid product, various processing stages thereby being adequately separated from each other by space while occurring simultaneously in time.

Another object is to provide a process in which sufficient and controlled agitation and mixing of charge materials is obtained thereby enabling efficient heat transfer, approach to equilibrium of chemical reactions and, in turn, closely controlled product composition.

Another object of the process and apparatus of the present invention is to maintain near optimum process temperatures by independent heating for different processing stages, and in particular, by supplying concentrated heat where required, such as during melting.

Another object is to provide a process and apparatus in which hot gas atmospheres within the reaction zones are controlled to prevent reoxidation of metallic iron to iron oxide, thereby minimizing refractory erosion by liquid iron oxide, increasing product yield and facilitating control of product composition.

Another object of the process and apparatus of this invention is to provide for utilizing a wide variety of fuels and reductant, in the form of various grades of coal and coke, natural and manufactured gas, and fuel oils.

A further object of the process and apparatus of this invention is to facilitate nearly complete combustion of furnace gases, thereby minimizing loss in the exhaust gas of heating values in unburned fuel, for example, unburned carbon monoxide.

Another object is to utilize the hot waste gases from advanced processing stages to make up part of the heat for preceding stages, that is, waste heat from refining is used for melting and reduction, and also waste heat from melting is used for reduction.

A further object is to provide for a continuous or near continuous discharge of liquid metal at constant temperature and composition, which is particularly advantageous in combination with a subsequent continuous casting operation.

A still further object is to obtain high yields by recirculating nearly all valuable byproduct materials into the charge and discarding mainly materials of little value.

Further objects of the new process and apparatus of this invention which relate to the economics of iron and steel making are to provide lower fuel requirements, higher metal yields, fewer operating personnel, and simpler process equipment at lower cost, than by using known processes.

The process of the present invention comprises a solid-state reduction, in a gas-solid reaction zone, of pellets containing iron oxide in a heated admixture of excess solid reductant, followed by removal of the excess reductant after completion of reduction to the desired extent, while retaining the pellets in process at elevated temperature under a controlled atmosphere; melting of the retained pellets in a gas-solid-liquid reaction zone forming two liquid phases of metal and slag; and refining of the metal in a gas-liquid reaction zone prior to discharge and casting. The key step of removing the excess reductant is facilitated by selecting the dimensions of charge materials so that (a) the pellets are not smaller than a selected minimum size, usually about 5 millimeters, and (b) the reductant material is not larger than a maximum size selected to ensure its near complete removal, by size separation from the pellets, from the gas-solid reaction zone at an intermediate processing stage. In addition to reductant, the introduction of sulfur-absorbent material to prevent sulfur contamination of the pellets is usually required into the gas-solid reaction zone, this material also being of a selected maximum size to effect its removal along with the excess reductant material. The process provides means for close control of product composition over a wide range, and this control is largely obtained by (a) effecting a consistently high degree of metallization of the pellets in the gas-solid reaction zone, and (b) introducing controlled quantities of fluxing and alloying materials into the process, which are melted along with the pellets and thereby take part in and control the slag-metal refining reactions in the gas-liquid reaction zone.

The zones of the process and apparatus are preferably of elongated form, and the charge materials are continually and successively advanced along the zones while being subjected to continual agitation and mixing action.

The desired process temperatures are obtained by introducing heat at spaced intervals along the process, directly into each of the gas-solid, gas-solid-liquid, and gas-liquid reaction zones, thereby heating each zone independently. Hot products of combustion flow countercurrent to the general movement of charge materials and are expelled from the gas-solid reaction zone.

Another aspect of the invention consists of a preferred rotary reactor suitable for conducting the process of this invention. In general terms, this apparatus comprises a single, elongated rotary kiln-type reactor unit containing a gas-solid reaction zone, a gas-solid-liquid reaction zone and a gas-liquid reaction zone extending in this sequence from the charge end to the discharge end; feeding equipment for introducing solid charge materials into the gas-solid reaction zone; at least one and preferably a plurality of burners adapted for introducing heat and oxygen-containing gas at spaced intervals along the gas-solid reaction zone; a screening device forming a portion of the reactor wall for removing fine-sized materials from the gas-solid reaction zone just prior to passing the retained coarse-sized materials into the gas-solid-liquid reaction zone; a burner for introducing heat directly into the gas-solid-liquid reaction zone for melting; a burner at the reactor discharge end for introducing heat for refining directly into the gas-liquid reaction zone; and a discharge opening for discharging liquid ferrous metal and slag from the reactor.

Preferred additional features include charging equipment for solid materials at intervals along the gas-solid reaction zone and at the reactor discharge end; sealing devices for the screen and fine-sized material discharge, and also the charge and discharge and openings; an annular dam adapted for dividing and confining partly liquid charge materials in the gas-solid-liquid reaction zone; and a special mounting assembly for movably positioning the discharge end burner, and an attached slag dam, in the reactor discharge end opening.

As will become apparent from the description to follow, a wide range of ferrous alloys may be produced by the process and the apparatus of this invention, including various grades of steels, cast irons and special alloys of iron.

Various other objects, features, advantages and methods of operation of the new process and apparatus will become apparent from the following detailed description and claims, and by referring to the accompanying diagrammatic drawings, in which:

FIG. 1 is a general flowsheet illustrating the process;

FIG. 2 is a schematic side view, partly in section, of an embodiment of rotary, kiln-type reactor apparatus suitable for carrying out the process of the invention;

FIG. 3 is a detailed section, on an enlarged scale, of a suitable burner arrangement for introducing heat and an oxygen-containing gas into the reactor;

FIG. 4 is a detailed section, on an enlarged scale, of an alternative burner arrangement to the one shown in FIG. 3;

FIG. 5 is a detailed section of a portion of the reactor, on an enlarged scale, showing a device for removing fine-sized materials from the gas-solid reaction zone, and a suitable burner arrangement for the control of temperature and gas composition in proximity to the junction between the gas-solid and gas-solid-liquid reaction zones of the process;

FIG. 6 is a transverse view, partly in section, of the device of FIG. 5;

FIG. 7 is a side elevation, partly in section and on an enlarged scale, of the feed end of the reactor, showing a suitable arrangement for supplying fuel and oxygen-containing gas to the reactor, and also showing a preferred feeding device for solid materials into the charge end of the reactor;

FIG. 8 is a transverse sectional view of the reactor at the location of discharging the feeding device shown in FIG. 7, and showing the preferred position of the discharge end of the feedpipe in relation to the inner wall of the reactor;

FIG. 9 is a fragmentary, transverse sectional view, on an enlarged scale, of part of the reactor showing, in elevation, a suitable feeding device for solid charge materials at intermediate locations along the gas-solid reaction zone;

FIG. 10 is a side elevation, partly in section, of a discharge end of the reactor showing a burner, atmosphere seal, slag dam, and discharging device arrangement; and FIG. 11 is a transverse sectional view, on an enlarged scale, of the burner shown in FIG. 10 at the location of the slag dam.

Referring to FIG. 1, it may be seen that the preparation of feed pellets of a selected minimum size is an essential feature of the process. The preparation of material containing iron oxide generally involves crushing and grinding of iron ore, followed by concentrating using known processes, in order to increase the iron oxide content and decrease the gangue and other undesirable impurities. In order to obtain pellets of the required size range, the concentrate is then reagglomerated generally according to known practice by means of balling drums or discs. With some high-grade ores, the concentrating step may be omitted, or screened raw ore may be used directly as a feed for the process, in which case reference to screened pieces of ore would be considered to be synonymous with reference to pellets containing iron oxide. In order to avoid excessive slag volumes in the gas-liquid reaction zone and to reduce any tendency of the pellets to soften and become sticky in the gas-solid reaction zone, it is generally desirable to have an iron content of at least 65 percent in the ore or concentrate, it being understood this is not a limitation.

The pellets may be charged in the moist or "green" state, or following a drying, roasting or other operation designed to improve their coherency or amenability to reduction. The pellets also may contain additions of fluxing and alloying materials such as lime, carbon or metallic oxides and alloys. Metallic iron fines unavoidably produced by in-process pellet degradation and removed as fine-sized material along with the excess char, are also normally reground and added to the concentrate to comprise an important constituent of the pellets. In order to obtain a selected minimum size, the pellets are generally screened for removal of the fines, ¼-inch diameter being a typical size.

The solid reductant material is generally coal or coal char. A fairly wide range of grades may be used, each reductant requiring individual evaluation in this respect. High reactivity and good resistance to disintegration are important properties, but of course must be considered together with other physical and chemical properties and cost. Reductant should be sized, and the maximum piece size is governed by the minimum pellet size referred to above, according to the guiding criterion of obtaining a clean in-process size separation. In order to avoid excessive carbon loss in the waste gas dust, reductant finer than about 20 or 28 mesh is also generally undesirable.

The pellets and reductant usually contain sufficient sulfur to be objectionable if advanced to the melting and refining stages. Limestone or dolomite can be used as a sulfur-absorbent material to react and combine with this sulfur, also in the form of particles sized for removal along with the excess reductant.

The amount of reductant material charged should be sufficient to provide an excess of solid carbon, after most of the iron contained in the pellets has been reacted to metallic state in the gas-solid reaction zone, of more than 10 percent of the weight of pellets in the charge. Depending upon the type of reductant material used, the amount of reductant usually is between 40 and 80 percent of the weight of pellets charged. Since reductant particles normally act as a nonagglomerating interferring medium between pellets and pellet fragments, larger proportions of reductant up to 200 percent of the weight of pellets may be employed in the event softening and sticking of the charge should be encountered as a result, for example, of high temperatures or excessive gangue in the pellets. The amount of sulfur-absorbent material required can vary from zero to 10 percent of the weights of pellets, the quantity employed depending upon the amount of sulfur contained in the reductant material and pellets, and also upon the maximum sulfur permissible in the liquid metal product.

Pellets, reductant material and sulfur-absorbent material are introduced into the charge mixture in the gas-solid reaction zone, generally together at the feed end of the process, although varying proportions of the reductant material and sulfur-absorbent material may be introduced at a later stage, at intermediate locations along the gas-solid reaction zone. The charge is heated to a temperature within the range of 1,500° F. to 2,300° F., preferably between 1,800° F. and 2,200° F. and said temperature is usually maintained nearly constant for a period longer than 10 minutes, and up to several hours, the time and temperature employed being selected mainly according to the reactivity of the reductant material and the physical and chemical constitution of the pellets.

As the charge mixture is continually advanced, a substantial proportion of the heat required for heating and maintaining the charge mixture at reaction temperature is supplied by introducing an oxygen-containing gas, usually air which may be preheated, at spaced intervals along the gas-solid reaction zone. The air creates heat by reacting with the reductant material in the charge mixture and also with combustible gas generated from the bed of charge mixture, the said combustible gas and the products of combustion flowing in general countercurrent to the flow of charge material. Hot gas emitted from the gas-solid-liquid reaction zone and flowing countercurrent to the material flow, also provides a heat source for the gas-solid reaction zone. Any additional heat, if required, is supplied from an external source at spaced intervals along the gas-solid reaction zone, for example, by supplying at intervals a gaseous or liquid fuel with sufficient oxygen-containing gas for combustion of the fuel.

Coal, char, or low-temperature coke containing a high proportion of volatile matter which, in many locations, is lower in cost or more readily available than low-volatile materials, can be utilized most effectively by its introduction into the charge mixture at an intermediate location, or locations along the gas-solid reaction zone. The volatile matter is evolved as a gas upon heating and is combusted with oxygen-containing gas as it flows towards the feed end of the process, the heat thus generated being utilized for heating and to maintain reaction temperature. Should the sulfur content of the pellets or reductant material be high, it may also be advantageous to add additional sulfur-absorbent material along with the late-charged reductant material, these materials all being substantially within the size range as previously defined for reductant material and sulphur-absorbent material.

As well as reductant material and sulfur-absorbent material, alloying materials and fluxing materials are generally introduced into the charge mixture along the gas-solid reaction zone, with the purpose of controlling the slag and metal chemistry in the subsequent gas-liquid reaction zone of the process. In this way these additions, which must be at least as large as the minimum pellet size to avoid being discarded, are preheated prior to melting.

When the iron oxide contained in the pellets has been reacted, in a substantial proportion, to metallic state, the fine-sized materials are removed from the gas-solid reaction zone. The materials removed include most, if not all, of the unconsumed reductant material, ash, and sulfur-absorbent material, along with any fine-sized pellet fragments obtained by disintegration of the pellets. After removal, these fine materials are generally cooled under a nonoxidizing atmosphere or quenched in water, coal char and pellet fragments being recovered by wet screening and magnetic separation methods. The coal char is usually recirculated into the gas-solid reaction zone, preferably after screening out the very fine particles, and comprises a substantial proportion of the reductant material in the charge mixture. The pellet fragments can be reground and added to the ore or concentrate before pelletizing, and hence recharged into the process as part of the pellets; or alternatively, in their existing form or after briquetting, be used as a feed for other steel or iron making furnaces; or be used in other metallurgical operations, for example, copper cementation. Sulfur-absorbent material particles, usually consisting of very fine hydrated lime or dolomite, are generally discarded since they contain considerable sulfur and are of small value.

The coarse-sized materials, including pellets, alloying materials and fluxing materials added up to the stage of the removal of fine-sized materials, are retained for further processing, which involves heating and advancing them into a gas-solid-liquid reaction zone containing a partially melted charge mixture in contact with hot gases, where concentrated heat is directly introduced until melting is completed, whereby two liquid phases in close contact, a top layer of slag and a bottom layer of liquid ferrous metal, are formed and are introduced into a gas-liquid reaction zone. Thus, the heat required for melting is supplied in part by hot gases emitted from the gas-liquid reaction zone and flowing countercurrent to the movement of partly-melted material, and in part by combustion between fuel and oxygen-containing gas introduced directly into the gas-solid-liquid reaction zone.

It should be understood that the term gas-liquid reaction zone implies the occurrence of liquid-liquid and gas-gas reaction, as well as gas-liquid reactions within the said zone. Similarly, reactions involving only solids, and only gases, occur in the gas-solid reaction zone. The term gas-solid, then implies only that the physical state of the principal phases present, of the materials in process, are solid or gaseous, and the term gas-liquid, that they are liquid or gaseous. In the transition zone where melting occurs, there are gases, liquids and solids present simultaneously.

In the gas-liquid reaction zone, also of elongated form, the liquid metal and slag are continually agitated and advanced until slag-metal reactions approach chemical equilibrium by which the retained and melted charge materials achieve a substantially constant and controlled composition prior to discharge. The gas-liquid reaction zone is also heated by independent means generally near the point of discharge. Control of final metal temperature and composition is thereby achieved by adjustment of this heat input and regulation of quantity and composition of the coarse-sized retained charged materials. If required, further analysis adjustment can be effected by adding more alloying and fluxing materials directly into the liquid metal and slag, either just prior to discharge or following discharge. The discharge temperature would generally be within the range of 2,300° F. to 3,100° F., the temperature selected depending upon the metal composition and subsequent use.

The slag flow can be regulated by means of an adjustable barrier obstructing the slag discharge opening, enabling a control to be maintained of the thickness of the liquid slag layer in contact with the metal within the gas-liquid reaction zone. The liquid metal and slag may be separated during discharge or be discharged together and separated after discharge; or the metal may be withdrawn separately by syphon, or tapped separately from the gas-liquid reaction zone at regular intervals. The metal may be cast directly after slag separation; alternatively it may be tapped into a holding furnace or ladle and subsequently be poured into molds, or be continuously cast.

FIG. 2 illustrated a rotary kiln-type reactor suitable for implementing the process which has been described. The body of the reactor consists of a cylindrical steel shell 1 which, with the exception of a relatively small area at the location of the screen section 13, is lined with refractory material 5. The refractory may consist of multiple layers, for example, an inner layer of a strong material having good resistance to heat, wear and chemical attack and an outer layer, next to the reactor shell, consisting of an insulating material to prevent the passage of heat from inside the reactor to the outer shell and hence to the surrounding air.

The entire unit is supported by means of rollers 3, resting on conventional kiln trunnions mounted on the foundation supports 2, and is adapted to be rotated at a predetermined number of revolutions per minute, such as by a motor and train of speed-reducing gears, the last one of which is meshed with bull gear 7 secured around the reactor shell. The reactor is usually inclined at a small angle to the horizontal, to cause the charge material to flow by gravity from the feed end towards the discharge end as the reactor is rotated.

Only solid charge materials 9 are contained in the gas-solid reaction zone which extends from the charge end feed apparatus 6, to a location on the discharge side of the dam 18, where there is a transition to the gas-solid-liquid reaction zone, which contains both solid and liquid charge materials 12. Only liquid charge materials 15 are contained in the gas-liquid reaction zone, which extends to the discharge opening 19. The slag and metal may be separated after discharge by slag separation device 20. Substantially, only the coarse-sized materials are retained within the gas-solid reaction zone and advance to the gas-solid-liquid reaction zone, the fine-sized materials being discharged through the screening apparatus 13 into a receptacle 14.

Charging equipment 11 for reductant and sulfur-absorbent material, and charging equipment 16 for alloying materials and fluxing materials are provided for introducing solid materials into the charge mixture at intermediate locations along the gas-solid reaction zone. Fuel and oxygen-containing gas to maintain the required temperatures and control the gas composition within the zones are supplied into the gas-liquid reaction zone by the discharge end burner 22, directed into the gas-solid-liquid reaction zone by the burner 17, and supplied at intervals along the gas-solid reaction zone by the burners 10. Exit gases are withdrawn through the kiln head assembly 8, which is supported by cable 4, into a suitable gas-discharge duct under controlled suction by conventional means, for example, an induced draft fan and flow control louvres, not illustrated. One or more tapholes 21 for emptying metal and slag from the gas-liquid reaction zone is also provided.

Although various reactor lengths and diameters may be used, lengths of 200 to 400 feet and shell diameters of 10 to 16 feet are given by example only as being suitable for commercial installation, it being understood that these dimensions are not limitations. Also, the diameter can very along the reactor length, for example, the diameter along the gas-liquid reaction zone could be smaller than the gas-solid reaction zone diameter, thus decreasing the quantity of metal contained therein and also decreasing the time of residence of the liquid metal within the reactor. The reactor may comprise an integral body or may be formed by coupling two or more separate sections together to form the reactor.

The inner lining along the gas-liquid reaction zone is comprised of refractory known to be resistant to liquid metal and slag, according to known ironmaking and steelmaking practice. Upstanding baffles or lifters anchored within the gas-solid reaction zone according to known rotary-kiln and rotary dryer practice can be employed to increase the rate of heat transfer between the gases and solid charge material within the reactor. Such baffles may also serve to maintain a thorough mixing between the various pieces of material comprising the charge mixture, or to assist in advancing the solid charge mixture along the gas-solid reaction zone.

The most satisfactory angle of incline of the reactor axis is probably between 1° and 2° to the horizontal, although a level reactor could be operable, employing baffles to effect charge movement along the gas-solid reaction zone. The speed of rotation is generally within the range of 0.25 to 2 revolutions per minute and preferably about 1 revolution per minute, it being understood that these speeds are not limitations.

The charge mixture is fed into the reactor by means of the raw material feeder 6, and is advanced continually by gravity and the rotary movement of the reactor through the gas-solid reaction zone where it is heated and reacted in the solid state. The rotary movement of the reactor walls also provides continual mixing and movement between pieces of material within the bed of charge mixture, thus minimizing any tendency of the pieces to stick together and agglomerate and also promoting uniformity of heat transfer and chemical reactions between gases and charge mixture. Controlled quantities of an oxygen-containing gas, generally preheated air, and fluid fuel when required, are introduced into the reactor at intervals along the gas-solid reaction zone by means of the burners 10.

FIG. 3 shows a suitable type of shell-mounted burner for introducing fuel and oxygen-containing gas into the reactor. Air is supplied through air pipes 23, and gaseous fuel through fuel pipes 24, having individual flow control valves for each burner, and which are fastened to the shell of the reactor and rotate with it. The outer burner pipe 27, consisting of heat-resistant alloy material, projects through an opening 26 in the metal and refractory shell of the reactor. The outer burner chamber 33 is fastened to the reactor shell at its flanged end 25 by means of bolts or screws, which also act to hold the outer burner pipe 27 firmly in position. To enable the burner pipe to be easily removed for replacement or repair, the air nozzle section 31 is preferably attached to the outer burner pipe 27 at flanges 34 with bolts or screws. The inner pipe 32 and gas nozzle pipe 30, are centered inside the outer burner pipe 27 and the air nozzle section 31, by means of pipe-centering ring 28, and nozzle-centering rings 36.

In order to prevent clogging with charge material, to ensure uniform flame distribution around the periphery of the reactor and to avoid any direct flame impingement on the reactor walls, the burner nozzles are preferably located to be nearly coincident with the axis of the reactor and are directed along this axis. The burner shown in FIG. 3 fires simultaneously in opposite directions, countercurrently and cocurrently, to the general flow of gases within the reactor. Some advantages of two-directional firing are a lower flame velocity which reduces the likelihood of direct flame impingement on the reactor walls, and increased turbulence of gases inside the reactor, with resulting increased rate of gas-solid reactions.

An alternative type of burner with a unidirectional nozzle is illustrated in FIG. 4, which is similar in all other respects to the burner shown in FIG. 3 and can be pointed in either axial direction. The burner arrangements would be similar when using liquid fuel, except that a fuel-atomizing nozzle would be employed, according to known oil burner practice. Adequate liquid fuel pressure would be maintained by a booster pump mounted on, and rotating with, the reactor shell. In an alternative arrangement, the liquid fuel is stored in tanks mounted on the shell, and pumped directly to the burners. For air atomization, a shell mounted air compressor may be used. The electricity for the pump is supplied in known manner by means of stationary brushes in contact with rotating collector rings attached to the reactor shell.

Close temperature control is an important feature of the reactor. Temperatures are measured by means of thermocouples which project through openings into the reactor, and which are connected to temperature recorders through rotating collector rings in contact with stationary brushes. As this part of the structure is well known it has not been illustrated. The individual burner fuel and airflow control valves, not illustrated, are regulated according to the temperature readings obtained.

Referring to FIG. 7, which shows a suitable feed end arrangement of the reactor, fluid fuel, for example, natural gas, is supplied from an external source through flexible stationary duct 37, into and through an annular distributor head concentric with the axis of the reactor, by way of duct or ducts 45, through stationary section 38, which is attached to stationary reactor head 41, and into annular distributor duct 46 concentric with the reactor axis and located within rotating section 39, from where it passes through rotating connections 40 into the burner supply fuel pipes 24 which are also rotating with the reactor. A seal, between the stationary and rotating faces, which prevents leakage of fluid fuel from the distributor, is effected by two concentric sealing surfaces, an inner sealing surface 42 and an outer sealing surface 43, which are grooved and continuously supplied with sealing grease. A uniform pressure between the sealing surfaces can be maintained by means of cables 4 attached to the reactor head 41 and to counterweights by way of a system of pulleys, not illustrated. These greased sealing faces are maintained cool by a water jacket 44 located within the stationary head section.

The oxygen-containing gas, for example air, is preferably preheated by passing through a heat exchanger, up to 75 percent of the heat contained in the reactor exit gases being transferred to the incoming air in this manner. The preheated air is supplied through flexible stationary duct 47, into stationary section 48, into the through rotating section 49, which is connected to rotating axial pipe 50 which continues through, but is not in contact with an opening 55 in the reactor head, and which leads to rotating air distributor manifold 68 mounted on the exterior of, and rotating with, the reactor shell, and hence into rotating air pipes 23. A seal between the stationary and rotating section can be effected by grooved, lubricated surfaces 51, which are cooled by water jacket 52, or known equivalent sealing means. To maintain the required uniform contact pressure between these sealing surfaces, the stationary section 48 can be suspended by a system of cables and counterweights in a similar manner employed for the reactor head, or mounted on rollers which run on tracks parallel to the reactor axis, the necessary seal face pressures being supplied by pulleys and counterweights, or springs. The axial pipe 50 is held in its central position within the reactor by means of support rod 53, and externally of the reactor head by the adjustably positioned rollers 54. In order to prevent leakage of gas or air through opening 55 in the reactor head, a sealing curtain 56 of high-velocity air or other gas can be provided.

This gas curtain is emitted from an annular header pipe 57 which is supplied with air or other gas under pressure, through the pressurized gas supply pipe 72. The annular header pipe 57 encircles the rotating axial pipe 50, and is provided with a continuous slit opening 58 of adjustable width, or alternatively, a plurality of closely spaced nozzles, directed inwards to impinge on the outer surface of axial pipe 50. Since the exit gas within the reactor head is at a substantial velocity in a direction to cause flow out through opening 55, any leakage would be expected to be outwards. The high-velocity sealing gas, therefore, as well as being directed inwards towards the reactor axis is shown directed at an acute angle to the reactor axis towards the discharge end of the reactor. In addition to the preheated air supplied using the above described apparatus, it may be desirable, under some conditions, to supply air by means of fans mounted on, and rotating with the reactor shell.

A smooth flow of exit gas from the reactor can be maintained by means of tapered refractory section 59 and retaining ring 60, which is fastened to the end of the reactor shell. In order to prevent excessive heat loss from the reactor head, it is preferably lined with an insulating refractory material 61. When preheated air is employed, the air distributor manifold 68 and air pipes 23 along the reactor shell would also be insulated. A sealed connection between the freely suspended reactor head 41 and fixed exhaust gas duct 62 is effected by means of a water seal 63.

When the pellets are fed into the reactor in the moist or dried condition after pelletizing, without an intermediate hardening by roasting, they are very sensitive to shock and impact. Any rough handling prior to and during charging may result in breakage or weakening of the pellets, causing them to disintegrate to a fine size during passage through the gas-solid reaction zone and to be discarded through the screening apparatus with the excess reductant material and sulfur-absorbent material. Any such disintegration can be minimized by limiting the maximum pellet drop at transfer points, during conveying and feeding of the reactor, preferably to a maximum of about 6 inches, and certainly less than 12 inches.

Gentle feeding of charge material, including pellets, is obtained by means of the rotary feedpipe 64. The feedpipe is secured within a slidable, releasable bearing sleeve 65, in turn supported by, and adapted to be rotated within, the rollers 66. In the embodiment illustrated, the rollers are confined by bearing housing 69 according to known roller bearing practice, to substantially prevent radial and axial movement of the feedpipe during operation. The bearing housing is mounted on frame 67 attached to the reactor head. The feedpipe 64 is rotated, preferably at an adjustable and variable speed, by drive motor assembly 70, connected to gear and pinion 73 or other suitable driving linkage. The feedpipe opening through the reactor head can be sealed by a gas or air curtain sealing arrangement 71, similar to the sealing assembly 56, 57, 58 and 72, as used to seal the reactor air supply pipe opening. The feedpipe 64 is supplied with charge materials by means of a tapered chute (not illustrated) inclined at an angle somewhat greater than the friction angle or angle of repose of the material. In order to avoid any unbalancing of the reactor head assembly, with resulting unequal pressures around the circumference of the sealing faces 42 and 43, the center of gravity of the above-described apparatus is preferably located in line, vertically, with the longitudinal axis of the reactor.

An essential feature of this feeding apparatus is a close, limiting control over the speed of moving the charge mixture along the pipe, thus preventing any sudden impact due to high velocity at the discharge point 74. The angle of the feeding pipe 64 to the horizontal should not exceed either the angle of repose of the material or the friction angle of the pipe with material, and would be less than 30° to the horizontal. The feeding speed can then be controlled within a wide range by varying the rotational speed of the pipe. A close, limiting control of distance dropped after discharge is obtained by properly locating the pipe discharge end 74. Referring to FIG. 8, by locating the discharge point 74 close to the inner wall on the opposite side of the reactor to the side containing most of the charge material 125, the maximum drop can be controlled by limiting the distance from the discharge point to the wall, allowing the charge material to fall only a short distance, the descending charge material striking the descending reactor wall at an oblique angle, in this way avoiding any sudden impact of the pellets. The closest point along the inner circumference of the feedpipe at its discharge end preferably should be less than one foot from the reactor wall, thus avoiding any large drops. An additional decrease in dropping distance can be obtained by rotating the pipe in the opposite direction to the reactor, as indicated by the arrows 76 and 94 respectively, thereby discharging the material mainly from the quadrant of the pipe in closest proximity to the reactor wall. By using the above apparatus, the distance dropped is controllable and independent of the degree of filling of the reactor with charge material; any danger of obstructing the feedpipe with charge material is avoided; and the pipe can be cleaned, removed or replaced easily during operation.

FIG. 9 illustrates suitable charging equipment 11, of FIG. 2, for additional reductant and sulfur-absorbent material required in the gas-solid reaction zone, and charging equipment 16 for alloying and fluxing materials required in the gas-liquid reaction zone. Feed materials can be introduced into external scoop and hopper 75 by scooping from a pile or hopper beneath the reactor, or fed by gravity from an external hopper, according to known means for feeding rotary kilns. As the hopper approaches the uppermost position of its travel, the sealing gate 77 is opened inwards by a connecting lever 79 and roller 80, which is forced into the open position, close to the reactor shell, by contacting the fixed cammed surface 81, allowing the material to flow by gravity through internal feedpipe 82, into the reactor. During the balance, or major portion of reactor rotation, the sealing gate is held in the closed position by spring-loaded hinge 78, preventing the free interchange of gases between the reactor interior and the surrounding air. The internal feedpipe 82 preferably extends nearly to the central axis of the reactor to prevent its being covered by the bed of charge material during any portion of the reactor rotation.

Before passage of the charge mixture from the gas-solid reaction zone, the excess reductant material and sulfur-absorbent material are removed by means of the screening apparatus 13, illustrated in some detail in FIGS. 5 and 6. At this section, the circumference of the reactor is comprised of a plurality of screen support segments 83, which can be attached by bolts or other means of releasable fasteners to the shell flanges 84 of the reactor. The segments are enclosed on both ends by the radial end plates 85, which are to prevent the free passage of gas circumferentially between the enclosed cavities 90 of the screen support segments 83 and impart to the reactor the necessary structural rigidity in the screen section between shell flanges 84. The screen deck segments 86, through which the fine-sized materials inside the reactor are discharged, are mounted on the screen support flanges 87 along the inner radius of the screen support segments 83, and attached by releasable fasteners. Along the outer radius are mounted removable cover plates 88, and discharge doors 89 which, in the closed position, prevent the free flow of gases between the interior cavity 90 of the support segment, and the exterior surroundings of the reactor. The discharge doors 89 are held in the closed position by the spring-loaded hinges 91, an extension of the rotatable part of which is attached to connecting levers 92 and rollers 93.

As the reactor is rotated in the direction of the arrow 94, the screen deck segments 86 pass under and in contact with the bed of charge material contained, for example, up to the level of dotted line 95. Material finer than the screen openings is allowed to pass into the interior cavity 90 of the screen support segment 83. After an entire screen deck segment 86 is in contact with, and covered on the inner surface by charge material, the discharge door 89 is forced to the open position by the action of roller 93 contacting the adjustable, possible spring-mounted cammed surface 96, allowing the fine material to discharge through the door opening into, for example, a tank of cooling water. While the leading end 97 of the screen deck segment 86 is still covered with charge material the door is released and allowed to close by action of the spring-loaded hinge 91. Thus, by allowing the bed of charge material to prevent the free flow of gases between the reactor and surrounding atmosphere during that part of a revolution when fine-sized materials are being discharged, any danger of combustible gas loss, reoxidation of metallic iron to iron oxide or poor reactor atmosphere control is minimized.

The screen deck segments 86 generally consist of a fine wire supported from beneath by stringers of heavier section, or perforated plate, smooth on the inner surface, having openings with sharp acute-angled edges, to minimize plugging or blinding of the screen openings. Mechanical screen-cleaning apparatus, such as electromagnetically or pneumatically operated screen vibrators attached to the deck segments, or high-velocity jets of gas directed to impinge at intervals upon the outer deck surface, can also be employed if necessary. The entire assembly is preferably constructed of a heat-resistant metal alloy, for example, stainless steel type 310, in order to withstand high temperatures.

After the fine-sized materials have been discharged from the reactor, the remaining solid charge materials, consisting of pellets and usually alloying and fluxing materials, pass over the top edge 98 of dam 18 on the discharge side of which is the gas-solid-liquid reaction zone containing partly solid and partly liquid charge mixture. In order to avoid any softening and sticking of the pellets during passage over the top edge 98 of the dam 18, the top edge 98 is narrow, thus providing a short transfer period of the retained material.

In order to avoid any area within the reactor in which the charge is melted only to a sticky condition, agglomerating and sticking to the walls, the angle of incline of the reactor, height of the discharge opening 19 above the reactor bottom and distance between the dam 18 and the discharge opening 19 is preferably arranged to maintain an appreciable depth of liquid metal against the discharge side 99 of the dam 18. By this means, melting solid materials are immersed in a lubricating pool of liquid metal, thus preventing any tendency of adherence to the reactor walls by replenishing their coating of liquid metal and slag as the solid-liquid mixture is agitated by the rotary wall movement.

In order to provide the required heat for melting, and to control the gas atmosphere in the vicinity of the transition from the gas-solid to gas-solid-liquid reaction zone, a specially designed burner 17 is provided. The burner can be a similar type to the other shell-mounted burners but, in addition, is provided with an additional fuel inlet, or inlets, for the introduction of excess fuel beyond that required for heating, to create a nonoxidizing atmosphere in the vicinity of the screen section and to cool, if necessary, the hot gas passing from the gas-solid-liquid into the gas-solid reaction zone. FIGS. 5 and 6 illustrate a simple example of such a burner 17, mounted at the location of the screen section and partly directed into the gas-solid-liquid reaction zone to provide additional heat for melting. The outer burner chamber 33 is attached, by means of adapter plate 105, to the outer circumference of one of the screen support segments 83. The cavity 106 between the inner surface of the screen support segments and the outer burner pipe is preferably filled with a refractory material. Additional fuel is supplied through the valved supply line 100, conducted through the internal burner pipe 101, and directed by means of nozzle 102 against a circular deflection plate 103 having a flat or dished surface secured to the burner with connecting rods 104. The fuel is deflected in an approximately radial direction, almost uniformly distributed around the circumference of the reactor, intercepting and reacting with the gases emitted from the gas-solid-liquid reaction zone into the gas-solid reaction zone. By this means the nearly neutral, or weakly reducing, and very hot gases from the gas-solid-liquid reaction zone can be reacted to form the more strongly reducing, and cooler gases required in the gas-solid reaction zone.

In addition to the heat supplied into the gas-solid-liquid reaction zone by the burner 17 to assist in melting, the main source of heat in the gas-liquid and gas-solid-liquid reaction zone is the burner 22 (FIG. 2) located at the discharge end of the reactor and directed into the reactor through the main metal discharge opening and across the top of the slag surface. This burner is illustrated in the discharge end assembly shown in FIGS. 10 and 11. Preheated or oxygen-enriched air and fuel are supplied to the outer burner chamber 111 by the flexible air supply pipe 110 and fuel supply pipe 115. Fuel and air are kept separated nearly to the burner tip, where mixing and combustion occur in an elongated flame zone 116 in front of the burner nozzle.

As the liquid metal and slag are formed and advance through the gas-liquid reaction zone, the rotating refractory walls effect a continual mixing action, thereby increasing the rates of heat transfer into the metal from the hot gaseous products of combustion, increasing the rates of chemical reaction between metal and slag, and minimizing segregation of constituents contained within the metal and slag bath. In such a furnace which discharges liquid by overflowing through a restricted opening, it will be appreciated that the slag would tend to pass more quickly through the gas-liquid reaction zone than the metal, which could result in an insufficient slag depth for proper refining reactions. If, for example, the slag level 107 and the metal level 108 are as shown in FIG. 10, the rate of flow of slag into the discharge opening 19, and hence the quantity of slag in the discharging liquid stream 109, can be controlled by means of the adjustably positioned slag dam 119, restricting the size of the flow control gap 120. By this means, any waste of fluxing materials can also be avoided by increasing the average retention time of slag constituents within the gas-liquid reaction zone.

The slag dam 119 may consist either of refractory or a water-cooled shell of heat-resisting material, and be adjustable by moving the entire burner assembly. To accomplish this movement, the burner is mounted on carriage 139 having wheels 141 running on tracks 138. Adjustment of burner position in the axial direction is effected by adjusting the distance between roller 142 and carriage 139 by movement of bearing shoes 143 on track 144, and in the vertical direction by controlled rotation about the pivot bearing 138, these movements being effected by hydraulic cylinders 140 or a mechanical equivalent. Contact between roller 142 and the reactor may be maintained by means of counterweights attached by cable to the carriage assembly through pulleys. This arrangement also provides easy removal of the burner from the reactor for repair or to provide access to the reactor interior.

In order to prevent the free transfer of gases through the restricted opening 19, a sealing curtain of air or gas, similar in principle to assembly 56, 57, 58 and 72 can be used. The annular header pipe 122, supplied by a gas or under pressure from supply pipe 126, is attached to the outer container of the water jacket by an annular connecting barrier. Since the gas-liquid reaction zone is normally operated at a slight negative pressure relative to atmospheric pressure, the annular slit 121 is shown to be directed at an acute angle towards the inner walls of the discharge opening, impinging in a direction in opposition to the anticipated flow of the atmosphere into the reactor.

Heat may be applied to the inner walls of the discharge opening 19, if necessary to prevent any tendency of slag or metal to solidify and adhere to the refractory, by directing burners to impinge on the inner surface of the discharge opening. The method is employed most effectively when the burners are positioned to apply heat to a segment of the discharge opening 19 adjacent to the discharging metal stream, heating the surface of the refractory just prior to its contact with the liquid metal. Alternatively, the surface of the discharge opening may be heated by electric resistance elements embedded in the refractory. Tungsten, molybdenum or silicon carbide are examples of materials suitable for heating elements, and high-purity magnesia or alumina for the refractory lip material which encases the elements. Electrical energy can be supplied to the elements in known manner by means of stationary brushes in contact with collector rings attached to, and rotating with, the reactor shell.

It may also be desirable to inject finely divided alloying and fluxing materials, such as carbon, aluminum, calcium carbide, and ferrosilicon, either onto the top of the slag or injected into the metal bath to adjust the liquid metal composition. One or more injection lances 124, of known manner of construction and usually water cooled, can be provided for this purpose. The material to be injected would be entrained and injected under pressure using known means through the injection lance 124 to lance nozzle 125, which can be directed to either discharge onto the slag, or extend downwards through the slag into the bath. Additions by injection can also be made to the liquid metal after discharge and prior to casting.

A suitable internal burner construction is shown in FIG. 11, which is a transverse sectional view of the burner 22 through the axis of slag dam 119. Fluid fuel is supplied to the burner tip through inner fuel pipe 112 and oxygen-containing gas along air annulus 113 confined by air pipe 114. For use with hot air, an insulating annular space 117 is provided to minimize heat loss to the burner-cooling water circulated in water annulus 118. In the embodiment shown, incoming water is conducted to the burner nozzle end by four water circulation pipes 123 and returned by way of cooling water annulus 118. The slag dam 119 is attached to the outer burner pipe by slag dam support brackets 129 and is cooled by water supplied through water pipe 132 (FIG. 10) to water inlet 137 and circulated around dam water jacket 131 to water outlet 136. The opening 130 between the dam and burner provides a convenient opening for insertion of injection lance 124, also cooled by water confined in the annulus between outer jacket 133 and inner injection pipe 134, the cooling water being conducted to the lance tip through circulation pipe 135.

The liquid metal and slag may be discharged together by overflowing through discharge opening 119 and separated after discharge by a slag separation device 20 (FIG. 2), which may also be heated and of which there are a number of known variations. Alternatively, the metal may be syphoned from the reactor by way of a refractory tube inserted into the metal bath by way of opening 130. In this event, it may be desirable to discharge the slag intermittently, rather than continuously. The metal would be discharged by suction into a closed vessel under controlled negative pressure, or syphoned into a receptacle containing metal at a level lower than bath level 108. Metal and slag may also be discharged by way of tapping holes extending through the reactor shell, such as indicated by taphole 21 of FIG. 2. Holding furnaces, for example, electric induction-type furnaces, may also be used for accumulation and adjustment of metal composition prior to casting.

It will be appreciated that a preferred embodiment of the process and apparatus for the continuous production of fused iron and steel directly from ores has been described and illustrated and that variations and modifications may be made by persons skilled in the art, without departing from the spirit and scope of the invention defined in the appended claims.

I claim:

1. Apparatus for production of liquid ferrous metals of controlled composition directly from iron ore or iron ore concentrates comprising, in combination: an elongated, rotary reactor containing a gas-solid reaction zone, a gas-solid-liquid reaction zone and a gas-liquid reaction zone extending in this sequence from the charge end to the discharge end of the reactor; feed means adapted for introducing solid charge materials into the charge end of the reactor, including pellets containing iron oxide and solid reductant material, said solid reductant material of a size relatively smaller than said pellets; gas supply means at intervals along said gas-solid reaction zone adapted for supplying and introducing a free oxygen-containing gas into the reactor for reaction with said reductant and heating thereby of the charge; fine-sized materials separation and discharge means forming a portion of the wall of the reactor with screen openings adapted for removing fine-sized materials from said gas-solid reaction zone, including any reductant which remains as excess after completing reduction, while retaining the coarse-sized materials, including reduced pellets of metallic iron inside the reactor for further processing; burner means for introducing heat directly into said gas-solid-liquid reaction zone for melting whereby two liquid phases consisting of metal and slag are formed; rotating means for agitating, advancing and promoting heating of the solid and liquid charge materials in process along the entire length of the reactor from said charge to discharge end by rotation at the inner reactor walls; burner means at the discharge end of the reactor for directing independent heat into said gas-liquid reaction zone whereby liquid ferrous metal and slag of a desired composition and temperature are obtained; and discharge means for discharging liquid ferrous metal and slag from the discharge end of the reactor.

2. Apparatus for production of liquid ferrous metals of controlled composition directly from iron ore or iron ore concentrates comprising, in combination: an elongated, rotary reactor containing a gas-solid reaction zone, a gas-solid-liquid reaction zone and a gas-liquid reaction zone extending in this sequence from the charge end to the discharge end of the reactor; feed means adapted for introducing solid charge materials into the charge end of the reactor, including pellets containing iron oxide and solid reductant material of a size relatively smaller than said pellets; gas supply means at intervals along said gas-solid reaction zone adapted for supplying and introducing a free oxygen-containing gas into the reactor for reaction with said reductant and heating thereby of the charge; fine-sized materials separation and discharge means forming a portion of the wall of the reactor with screen openings adapted for removing fine-sized materials from said gas-solid reaction zone, including any reductant which remains as excess after completing reduction, while retaining the coarse-sized materials, including reduced pellets of metallic iron inside the reactor for further processing; burner means for introducing heat directly into said gas-solid-liquid reaction zone for melting whereby two liquid phases consisting of metal and slag are formed; annular dam means projecting inwards from the inner reactor wall to separate and provide a dividing barrier for the transition from said gas-solid reaction to said gas-solid-liquid reaction zone; rotating means for agitating, advancing and promoting heating of the solid and liquid charge materials in process along the entire length of the reactor from said charge to discharge end by rotation of the inner reactor walls; burner means at the discharge end of the reactor for directing independent heat into said gas-liquid reaction zone whereby liquid ferrous metal and slag of a desired composition and temperature are obtained; and discharge means for discharging liquid ferrous metal and slag from the reactor.

3. Apparatus according to claim 2 in which said feeding device at the charge end of the reactor comprises a rotary cylindrical feedpipe inclined downwardly in the direction of feeding material therethrough, and having its discharge end disposed close to the inner wall of the reactor in the quadrant adjoining the quadrant which contains most of the charge thereby reducing the length of drop of the charge material from said feedpipe discharge end and minimizing the possibility of fracture of said charge material.

4. Apparatus as in claim 2 which includes at least one opening through the wall of the reactor at an intermediate location between the charge end and said fine-sized materials separation and discharge means with feed means adapted for introducing solid charge materials through said opening into the charge mixture within the reactor.

5. Apparatus as in claim 2 wherein said gas supply means for introducing a free oxygen-containing gas into the reactor comprises an outer burner pipe projecting in through an opening in the reactor wall, and also includes an inner fuel pipe positioned within said outer burner pipe, each of said pipes terminating in at least one nozzle located in proximity to the reactor axis and directed in an axial direction of said reactor.

6. Apparatus according to claim 2 in which said burner means for introducing heat directly into said gas-solid-liquid reaction zone also includes a fuel nozzle and an axially located deflector plate positioned substantially at right angles to the longitudinal axis of the reactor to cause fluid fuel issuing from said nozzle to impinge upon said deflector plate and thereby be directed radially outward towards the inner reactor wall in the vicinity of the junction between the gas-solid and gas-solid-liquid reaction zones.

7. Apparatus according to claim 2 in which said fine-sized materials separation and discharge means comprises a plurality of adjacent screen segments disposed circumferentially around the reactor, each of said segments comprising an inner screen deck, an enclosed cavity on the exterior side of said screen deck for receiving fine-sized materials having enclosing walls adapted for separating each of said enclosed cavities from adjacent cavities and from the exterior atmosphere, at least one discharge opening with a controllable gate disposed in said enclosed walls of each of said cavities, and an actuating device for opening said gates for periodic discharge of fine-sized materials from within said enclosed cavities at selected intervals during rotation of the reactor.

8. Apparatus according to claim 7 characterized in that each of said plurality of adjacent screen decks is disposed so as to be in contact with, and substantially covered by, the charge mixture within the reactor during a portion of each revolution of the reactor, and each gate is actuable to cause the discharge of fine-sized materials only at a time when the entire screen deck of said enclosed cavity is substantially covered by, and in contact with, the charge mixture within the reactor, said charge mixture preventing the free passage of gasses between the interior and exterior of the reactor by way of said enclosed cavities, during that portion of a revolution of the reactor when said discharge gates are opened for removing fine-sized materials from within said enclosed cavities.

9. Apparatus according to claim 2 wherein said annular dam means comprises a circumferential dam projecting radially inwards a selected distance towards the central reactor axis and an appreciable depth of liquid metal is retained against the discharge side of said dam by means of a restricted axial discharge opening providing a weir for discharge behind which a bath of metal is maintained extending back along said gas-liquid and gas-solid-liquid reaction zone to said dam.

10. Apparatus according to claim 2 in which hot gases are exhausted to flow from the discharge end toward the charge end within the reactor and which includes an annular gas curtain emitted radially outwards under pressure from at least one annular slit nozzle to impinge upon the inner surface of a restricted axial discharge opening so as to limit the passage of secondary air into the reactor.

11. Apparatus for production of liquid ferrous metals of controlled composition directly from iron ore or iron ore concentrates, comprising in combination: an elongated rotary reactor containing a gas-solid reaction zone, a gas-solid-liquid reaction zone and a gas-liquid reaction zone extending in this sequence from the charge end to the discharge end of the reactor; feed means adapted for introducing solid charge materials into the charge end of the reactor, including pellets containing iron oxide and solid reductant material, said solid reductant material of a size relatively smaller than said pellets; gas supply means at intervals along said gas-solid reaction zone adapted for supplying and introducing a free oxygen-containing gas into the reactor for reaction with said reductant and heating thereby of the charge; fine-sized materials separation and discharge means forming a portion of the wall of the reactor with screen openings adapted for removing fine-sized materials from said gas-solid reaction zone, including any reductant which remains as excess after completing reduction, while retaining the coarse-sized materials, including reduced pellets of metallic iron inside the reactor for further processing; burner means for introducing heat directly into said gas-solid-liquid reaction zone for melting whereby two liquid phases consisting of metal and slag are formed; annular dam means projecting inwards from the inner reactor wall to separate and provide a dividing barrier for the transition from said gas-solid reaction zone to said gas-solid-liquid reaction zone; rotating means for agitating, advancing and promoting heating of the solid and liquid charge materials in process along the entire length of the reactor from said charge to discharge end by rotation of the inner reactor walls; burner means at the discharge end of the reactor for directing independent heat into said gas-liquid reaction zone whereby liquid metal and slag of a desired composition and temperature are obtained; slag dam means penetrating the slag layer within said gas-liquid reaction zone adapted for adjustably restricting and controlling the rate of slag flow through a restricted axial discharge opening at the discharge end of the reactor; and discharge means for discharging liquid ferrous metal and slag from the reactor.

12. Apparatus according to claim 11 in which said slag dam means and burner means at the discharge end are integrally connected together and comprise a slag dam attached to project downwardly from a burner pipe projecting into said discharge opening, a carriage supporting said burner at one place by a horizontal pivot substantially at right angles to the longitudinal furnace axis and at a second place by a vertical positioning member adapted to effect controlled vertical rotation lengthwise about said horizontal pivot for vertical positioning of said burner and attached slag dam within said discharge opening.

13. Apparatus according to claim 12 which also includes a connecting member between said movable support and the furnace during rotation and adapted for maintaining a selected distance of projection of said burner and attached slag dam within said discharge opening.